United States Patent
Honma et al.

(10) Patent No.: US 9,428,396 B2
(45) Date of Patent: Aug. 30, 2016

(54) METHOD FOR PRODUCING LITHIUM TITANATE PRECURSOR, METHOD FOR PRODUCING LITHIUM TITANATE, LITHIUM TITANATE, ELECTRODE ACTIVE MATERIAL, AND ELECTRICITY STORAGE DEVICE

(75) Inventors: Masatoshi Honma, Mie (JP); Kazuyoshi Takeshima, Mie (JP); Yusuke Okuda, Mie (JP); Tsunehisa Takeuchi, Mie (JP)

(73) Assignee: ISHIHARA SANGYO KAISHA, LTD, Osaka (JP)

( * ) Notice: Subject to any disclaimer, the term of this patent is extended or adjusted under 35 U.S.C. 154(b) by 195 days.

(21) Appl. No.: 14/113,064

(22) PCT Filed: Apr. 26, 2012

(86) PCT No.: PCT/JP2012/061241
§ 371 (c)(1),
(2), (4) Date: Oct. 21, 2013

(87) PCT Pub. No.: WO2012/147864
PCT Pub. Date: Nov. 1, 2012

(65) Prior Publication Data
US 2014/0048968 A1 Feb. 20, 2014

(30) Foreign Application Priority Data
Apr. 28, 2011 (JP) ................................. 2011-100669

(51) Int. Cl.
C04B 35/462 (2006.01)
C01D 15/02 (2006.01)
C01G 23/00 (2006.01)
(Continued)

(52) U.S. Cl.
CPC ............. *C01D 15/02* (2013.01); *C01G 23/005* (2013.01); *H01M 4/131* (2013.01); *H01M 4/30* (2013.01); *H01M 4/485* (2013.01); *H01M 10/052* (2013.01); *Y02E 60/122* (2013.01); *Y02P 70/54* (2015.11)

(58) Field of Classification Search
CPC .......................... C04B 35/462; C01G 23/005
See application file for complete search history.

(56) References Cited

U.S. PATENT DOCUMENTS 4,044,958 A * 8/1977 Gutjahr ........................ 241/126
6,475,673 B1 * 11/2002 Yamawaki et al. ........ 429/231.5
(Continued)

FOREIGN PATENT DOCUMENTS

| CN | 101659448 A | 3/2010 |
|----|-------------|--------|
| CN | 101807696 A | 8/2010 |

(Continued)

OTHER PUBLICATIONS

International Search Report from corresponding International Application No. PCT/JP2012/061241.
(Continued)

*Primary Examiner* — Erin Snelting
(74) *Attorney, Agent, or Firm* — Hauptman Ham, LLP

(57) ABSTRACT

A method for producing a lithium titanate precursor includes the step of grinding a lithium compound and a titanium compound in a state where these compounds coexist. More preferably, a method for producing a lithium titanate precursor includes the steps of; mixing a lithium compound and a titanium compound; and grinding the lithium compound and the titanium compound in a state where these compounds coexist by the mixing.

19 Claims, 1 Drawing Sheet

(51) Int. Cl.
*H01M 4/131* (2010.01)
*H01M 4/30* (2006.01)
H01M 4/485 (2010.01)
H01M 10/052 (2010.01)

(56) References Cited

U.S. PATENT DOCUMENTS

| | | |
|---|---|---|
| 2004/0202934 A1 | 10/2004 | Zaghib et al. |
| 2007/0194268 A1* | 8/2007 | Endo et al. ............ 252/62.56 |
| 2007/0243467 A1 | 10/2007 | Zaghib et al. |
| 2008/0285211 A1 | 11/2008 | Zaghib et al. |
| 2011/0121226 A1 | 5/2011 | Awano |
| 2012/0135311 A1 | 5/2012 | Zaghib et al. |
| 2013/0045422 A1 | 2/2013 | Suita et al. |
| 2013/0244114 A1 | 9/2013 | Yamamoto et al. |
| 2014/0050657 A1 | 2/2014 | Takeshima |
| 2014/0356725 A1 | 12/2014 | Zaghib et al. |

FOREIGN PATENT DOCUMENTS

| | | |
|---|---|---|
| CN | 101844803 A | 9/2010 |
| CN | 101944591 A | 1/2011 |
| CN | 101944600 A | 1/2011 |
| CN | 102044665 A | 5/2011 |
| EP | 1339642 B1 | 11/2009 |
| EP | 2328212 | 6/2011 |
| EP | 2565161 A1 | 3/2013 |
| EP | 2612840 A1 | 7/2013 |
| EP | 2703355 A1 | 3/2014 |
| JP | 6-275263 | 9/1994 |
| JP | 2000-302547 | 10/2000 |
| JP | 2001-192208 | 7/2001 |
| JP | 2001-213622 | 8/2001 |
| JP | 2002-289194 | 10/2002 |
| JP | 2010-100442 | 5/2010 |
| JP | 2010-254482 A | 11/2010 |
| JP | 2011-111361 | 6/2011 |
| JP | 2012-033279 | 2/2012 |

OTHER PUBLICATIONS

Supplementary European Search Report for corresponding European Application No. 12776557, dated Feb. 11, 2015.

* cited by examiner

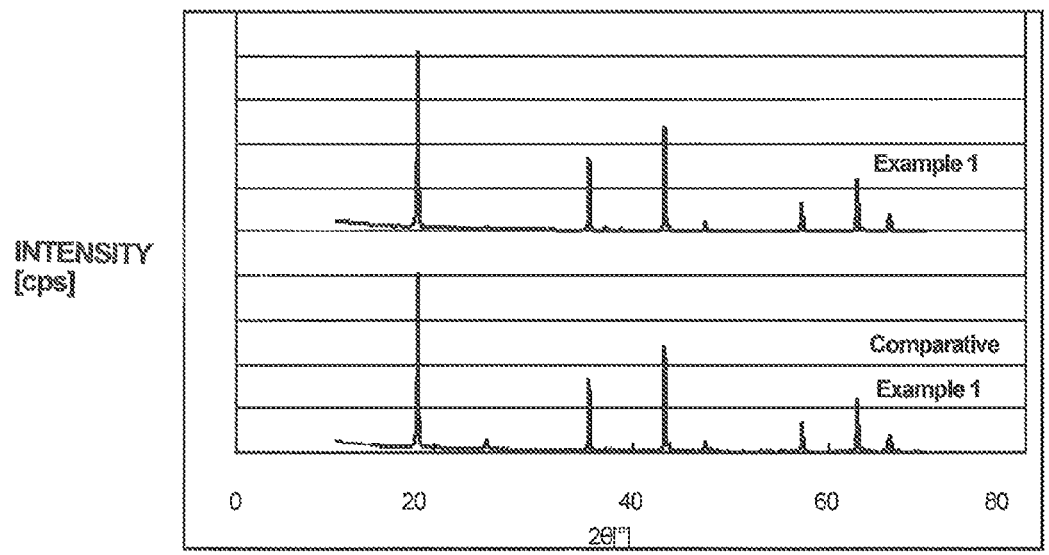

METHOD FOR PRODUCING LITHIUM TITANATE PRECURSOR, METHOD FOR PRODUCING LITHIUM TITANATE, LITHIUM TITANATE, ELECTRODE ACTIVE MATERIAL, AND ELECTRICITY STORAGE DEVICE

TECHNICAL FIELD

The present invention relates to methods for producing a lithium titanate precursor and lithium titanate. More particularly, the present invention relates to methods for producing lithium titanate that can be efficiently produced at low cost and that is useful as a material for electricity storage devices. The present invention also relates to lithium titanate, and electrode active materials and electricity storage devices containing the same.

BACKGROUND ART

Lithium titanate is under development as a material of electricity storage devices, and is used in the electricity storage devices as an electrode active material that is advantageous in terms of safety and life characteristics, and especially in lithium secondary batteries as a negative electrode active material. The lithium secondary batteries are spreading rapidly for use as small batteries such as mobile devices' power sources, and are also being developed into large lithium secondary batteries for power generation industries and automobiles. Long-term reliability and high input/output characteristics are required for electrode active materials for such large lithium secondary batteries, and lithium titanate that is advantageous in terms of safety and life characteristics is a promising material as a negative electrode active material.

As described in, e.g., Japanese Unexamined Patent Application Publication No. H06-275263 (Patent Literature 1), there are some compounds as such lithium titanate. For example, as lithium titanate represented by the general formula "$Li_xTi_yO_4$," compounds satisfying $0.8 \leq x \leq 1.4$ and $1.6 \leq y \leq 2.2$ are described, and $LiTi_2O_4$, $Li_{1.33}Ti_{1.66}O_4$, $Li_{0.8}Ti_{2.2}O_4$, etc. are shown as representative examples. Known methods for producing such lithium titanate include a wet method in which a predetermined amount of lithium compound and a predetermined amount of titanium compound are mixed in a solvent and the mixture is dried and then baked (Japanese Unexamined Patent Application Publication No. 2001-213622: Patent Literature 2), a spray drying method in which the drying in the wet method is performed by spray drying (Japanese Unexamined Patent Application Publication No. 2001-192208: Patent Literature 3), a dry method in which a predetermined amount of lithium compound and a predetermined amount of titanium compound are mixed in a dry state and the mixture is baked (Japanese Unexamined Patent Application Publication No. H06-275263: Patent Literature 1, Japanese Unexamined Patent Application Publication No. 2000-302547: Patent Literature 4), etc.

CITATION LIST

Patent Literatures

PTL 1: Japanese Unexamined Patent Application Publication No. H06-275263
PTL 2: Japanese Unexamined Patent Application Publication No. 2001-213622
PTL 3: Japanese Unexamined Patent Application Publication No. 2001-192208
PTL 4: Japanese Unexamined Patent Application Publication No. 2000-302547

SUMMARY OF INVENTION

Technical Problem

In the above dry and wet methods, a lithium compound and a titanium compound are baked to produce lithium titanate. However, since these are solid-phase diffusion reactions, reactivity between these raw materials is low, by-products having different compositions or residual unreacted raw materials tend to exist in addition to intended lithium titanate. Accordingly, sufficient electric capacity cannot be obtained when such lithium titanate is used in batteries. Increasing the baking temperature is advantageous in terms of the reactivity, but tends to cause volatilization loss of lithium, or facilitates contraction and sintering and grain growth of lithium titanate particles. This reduces the specific surface area of the lithium titanate particles, and tends to degrade rate characteristics when the lithium titanate is used in batteries.

Solution to Problem

The inventors intensively studied a method for efficiently producing intended lithium titanate, in order to improve reactivity between a lithium compound and a titanium compound, and found that the above problem could be solved by producing a lithium titanate precursor (which means a material containing at least a lithium compound and a titanium compound and being changed into lithium titanate by heating) by grinding or crushing at least a lithium compound and a titanium compound in the state where these compounds coexist. The inventors also found that the reactivity between the lithium compound and the titanium compound could further be improved and productivity in industrial production could be improved by applying pressure to the compounds simultaneously with and/or after the grinding or crushing.

Characteristic configurations of the present invention are as follows.

(1) A method for producing a lithium titanate precursor, including the step of: grinding a lithium compound and a titanium compound in a state where these compounds coexist.

(2) The method according to (1), wherein the grinding step includes adding a lithium titanate compound having a same crystal structure as intended lithium titanate, in addition to the lithium compound and the titanium compound.

(3) A method for producing a lithium titanate precursor, including the steps of: mixing a lithium compound and a titanium compound; and grinding the lithium compound and the titanium compound in a state where these compounds coexist by the mixing. The mixing step and the grinding step may be performed simultaneously, or the grinding step may be performed after the mixing step.

(4) The method according to (3), further including the step of: prior to the mixing, grinding either one of the lithium compound and the titanium compound.

(5) The method according to (3) or (4), wherein the mixing step includes adding a lithium titanate compound having a same crystal structure as intended lithium titanate, in addition to the lithium compound and the titanium compound, and the grinding step includes grinding the lithium compound, the titanium compound, and the lithium titanate compound in a state where these compounds coexist.

(6) The method according to any one of (1) to (5), wherein the grinding is performed with an airflow crusher.

(7) The method according to any one of (1) to (6), further including the step of: pressing the compounds in a mixed state simultaneously with and/or after the grinding.

(8) The method according to (7), wherein the pressing is performed with a compression forming machine.

(9) The method according to (7), wherein the grinding and the pressing are performed with at least one machine selected from the group consisting of a fret mill, a pan mill, an edge runner, a roller mill, and a mix muller (kneader).

(10) The method according to any one of (7) to (9), wherein the pressing step is performed under a condition that bulk density of mixed powder is increased at least twice as high as before the pressing.

(11) A method for producing lithium titanate, including the step of: heating the lithium titanate precursor produced by the method according to any one of (1) to (10).

(12) The method according to (11), wherein the heating is performed at a temperature of 700° C. to 800° C.

(13) Lithium titanate produced by the method according to (11) or (12).

(14) An electrode active material containing the lithium titanate according to (13).

(15) An electricity storage device using the lithium titanate according to (13).

Advantageous Effects of Invention

In the method for producing lithium titanate according to the present invention, a lithium titanate precursor is produced by grinding at least a lithium compound and a titanium compound in the state where these compounds coexist. This improves reactivity between the titanium compound and the lithium compound, whereby intended lithium titanate can be efficiently produced. That is, intended lithium titanate with reduced production of sub-phases having different compositions and a reduced amount of residual unreacted raw materials and with a less progress in sintering and a less decrease in specific surface area can be reliably and stably produced even at a lower heating temperature than conventional production methods.

An electricity storage device having great battery characteristics, in particular great rate characteristics, can be produced by using lithium titanate produced by the above method as an electrode active material.

Moreover, the lithium titanate precursor is produced by applying a pressure to the compounds, simultaneously with and/or after grinding. This can further improve the reactivity between the lithium compound and the titanium compound, and can improve handling properties and increase the throughput (amount of material that is used) per unit time/facility in each step due to increased bulk density of the precursor, thereby improving productivity in industrial production. Moreover, bulk density of lithium titanate can be increased, and packing density can also be increased when lithium titanate produced in this process is used in electrodes.

BRIEF DESCRIPTION OF DRAWINGS

The FIGURE shows powder X-ray diffraction patterns of lithium titanate of an embodiment and a comparative example.

DESCRIPTION OF EMBODIMENTS

The present invention relates to a method for producing a lithium titanate precursor that contains at least a titanium compound and a lithium compound and that changes into lithium titanate by heating.

The invention according to a first aspect is characterized by including the step of grinding or crushing the lithium compound and the titanium compound in a state where these compounds coexist.

The invention according to a second aspect is characterized by including the steps of mixing a lithium compound and a titanium compound; and grinding or crushing the lithium compound and the titanium compound in a state where these compounds coexist by the mixing. In the second aspect, it is important to grind at least the titanium compound and the lithium compound in the state where these compounds coexist, and the mixing step and the grinding step may be performed simultaneously or the grinding step may be performed after the mixing step.

An inorganic titanium compound or an organic titanium compound such as titanium alkoxide can be used as the titanium compound. A compound of a titanic acid such as metatitanic acid represented by $TiO(OH)_2$ or $TiO_2.H_2O$ or orthotitanic acid represented by $TiO(OH)_4$ or $TiO_2.2H_2O$, a titanium oxide (crystalline titanium oxide in the form of rutile, anatase, brookite, bronze, etc., or amorphous titanium oxide), a mixture thereof, etc. can be used as the inorganic titanium compound. The titanium oxide may be, e.g., a titanium oxide having an X-ray diffraction pattern with diffraction peaks from a plurality of crystal structures, e.g., a titanium oxide having an X-ray diffraction pattern with anatase and rutile diffraction peaks, in addition to a titanium oxide having an X-ray diffraction pattern with only diffraction peaks from a single crystal structure. In particular, crystalline titanium oxide is preferable.

A fine titanium compound is preferable as the titanium compound in view of reactivity with the lithium compound. The mean primary particle diameter thereof (electron microscopy) is preferably in the range from 0.001 μm to 0.3 μm, more preferably in the range from 0.005 μm to 0.3 μm, still more preferably in the range from 0.01 μm to 0.3 μm, and further preferably in the range from 0.04 μm to 0.28 μm. The titanium compound preferably has a large specific surface area in view of the reactivity with the lithium compound. The specific surface area of the titanium compound is preferably 20 to 300 $m^2/g$, more preferably 50 to 300 $m^2/g$, still more preferably 60 to 300 $m^2/g$, and further preferably 60 to 100 $m^2/g$. In the case where such a titanium compound is granulated for use as secondary particles, the mean secondary particle diameter thereof (laser scattering method) is preferably 0.05 to 5 μm, more preferably 0.1 to 3.0 μm, and still more preferably 0.5 to 2.0 μm.

The titanium compound preferably has high purity, which is normally 90 wt % or more, and more preferably 99 wt % or more. The Cl or $SO_4$ content as impurities is preferably 0.5 wt % or less. More preferably, the contents of other elements are in the following specific ranges. Silicon (1,000 ppm or less), calcium (1,000 ppm or less), iron (1,000 ppm or less), niobium (0.3 wt % or less), and zirconium (0.2 wt % or less).

Any hydroxide, salt, oxide, etc. can be used with no specific limitation as the lithium compound used in the present invention. Examples of the lithium compound include lithium hydroxide, lithium carbonate, lithium nitrate, lithium sulfate, and lithium oxide. Either one of these lithium compounds or a combination of two or more of them may be used. Of these lithium compounds, lithium hydroxide, lithium carbonate, or lithium oxide is preferably used in order to prevent an acid radical from remaining in lithium titanate. Lithium hydroxide or lithium carbonate is more preferably used and lithium carbonate is still more preferably used due to ease of grinding. In the present invention, the term "acid radical" means sulfuric acid radical ($SO_4$) and chlorine radical (Cl).

The lithium compound preferably has high purity, which is normally 98.0 wt % or more. For example, in the case where lithium carbonate is used as the lithium compound, the $Li_2CO_3$ content is 98.0 wt % or more, and preferably 99.0 wt % or more, the content of an impurity metal element such as Na, Ca, K, or Mg is 1,000 ppm or less, and preferably 500 ppm or less, and the Cl or $SO_4$ content is 1,000 ppm or less, and preferably 500 ppm or less. It is desirable to use a sufficiently dehydrated lithium compound, and its moisture content is desirably 0.3 wt % or less.

The mean volume particle diameter of the lithium compound is not particularly limited, and any commercially available lithium compound can be used. For lithium carbonate, the mean volume particle diameter is commonly in the range of 10 to 100 μm. The lithium compound may be separately finely ground or crushed in advance. Such fine grinding is preferably performed so as to reduce the mean volume particle diameter to 5 μm or less and more preferably to 4 μm or less because reactivity of a lithium titanate precursor is enhanced. A known method can be used for the fine grinding process. In particular, the mean volume particle diameter of the lithium compound is preferably reduced to 5 μm or less, more preferably to 0.5 to 5 μm, and still more preferably to 1 to 5 μm by grinding. The mean volume particle diameter may be reduced to 4 μm or less, preferably to 0.5 to 4 μm, and still more preferably to 1 to 4 μm by grinding.

A known grinder can be used for the fine grinding process, e.g., a flake crusher, a hammer mill, a pin mill, a bantam mill, a jet mill, a fret mill, a pan mill, an edge runner, a roller mill, a mix marler, or a vibration mill. In this case, it is preferable to grind the lithium compound so as to reduce the number of coarse particles. Specifically, it is preferable that in a particle size distribution measured by the above method, D90 (the particle diameter at the cumulative frequency of 90%) is 10 μm or less, preferably 9 μm or less, and more preferably 7 μm or less.

The lithium compound preferably has a large specific surface area because the reactivity of the lithium titanate precursor is enhanced. In the case of, e.g., lithium carbonate, the specific surface area is preferably 0.8 $m^2/g$ or more, and more preferably 1.0 to 3.0 $m^2/g$.

In the present invention, at least the titanium compound and the lithium compound are ground in the state where these compounds coexist (hereinafter this method is sometimes referred to as "mixed grinding.") Grinding can be performed by placing both the titanium compound and the lithium compound in a grinder or a crusher. The other compound may be fed into the grinder after starting grinding one of the compounds, grinding may be started after both compounds are fed into the grinder, or both compounds may first be mixed in advance in a known mixer such as a Henschel mixer, and then fed into the grinder for grinding. A lithium titanate precursor having the titanium compound and the lithium compound sufficiently mixed together can be obtained by performing grinding in the state where the titanium compound and the lithium compound coexist. The atmosphere where grinding is performed is not particularly limited.

In the case of grinding at least the lithium compound and the titanium compound in the state where these compounds coexist, the titanium compound and the lithium compound can be mixed to a higher degree as compared to the case of merely mixing fine particles of the lithium compound and the titanium compound. In addition, a lithium titanate precursor can be obtained which contains the lithium compound and the titanium compound with a uniform particle diameter, namely with a narrow particle size distribution. Thus, a lithium titanate precursor having high reactivity between the lithium compound and the titanium compound is obtained.

A known grinder can be used for grinding. For example, a dry grinder is preferable such as a flake crusher, a hammer mill, a pin mill, a bantam mill, a jet mill, a fret mill, a pan mill, an edge runner, a roller mill, a mix marler, or a vibration mill. In particular, it is preferable to use an airflow crusher because high grinding efficiency can be achieved and especially the lithium compound can be finely ground. Examples of the airflow crusher include a jet mill and a cyclone mill, and it is more preferable to use a jet mill.

In the case of using an airflow crusher, it is preferable to use a titanium compound with low bulk density, specifically with bulk density in the range of 0.2 to 0.7 $g/cm^3$ because a lithium titanate precursor having high reactivity can be obtained. Such a titanium compound with low bulk density is easily dispersed by the air stream in the crusher, and is easily uniformly mixed with the lithium compound. The bulk density is more preferably in the range of 0.2 to 0.6 $g/cm^3$, and still more preferably in the range of 0.2 to 0.5 $g/cm^3$.

It is preferable that the lithium titanate precursor have one peak in a frequency curve of a particle size distribution measured with the lithium titanate precursor being dispersed in ethanol. It is preferable that the mean volume particle diameter be 0.5 μm or less and D90 (the particle diameter at the cumulative frequency of 90%) be 10 μm or less. It is more preferable that the mean volume particle diameter be 0.45 μm or less and D90 (the particle diameter at the cumulative frequency of 90%) be 6 μm or less. With the particle size distribution in this range, production of subphases having different compositions and the amount of residual unreacted raw materials can further be reduced, and intended lithium titanate with a less progress in sintering and a less decrease in specific surface area can be reliably and stably produced even at a lower heating temperature than conventional production methods.

In the present invention, it is preferable to perform, in addition to grinding at least the titanium compound and the lithium compound in the state where these compounds coexist, pressing these compounds simultaneously with and/or after the grinding.

In general, a ground product is bulky (low bulk density) and occupies a large volume per mass, productivity, e.g., throughput (amount of material that is used) per unit time/facility, is reduced. Pressing the ground product can suppress an increase in bulk thereof, and can achieve appropriate bulk density. Moreover, in the present invention, it is preferable to perform the pressing means because the pressing means facilitates contact between the titanium compound and the lithium compound and production of a lithium titanate precursor having high reactivity between the lithium compound and the titanium compound. Pressure (compression) forming means, pressure (compression) grinding means, etc. can be used as the pressing means. It is preferable that the pressing means increase the bulk density at least twice as high as before the pressing.

First, means for performing mixed grinding and then pressing the mixed-ground product will be described. Although pressure (compression) forming is preferable as such means, the mixed-ground product may further be subjected to pressure (compression) grinding described below.

The pressure (compression) forming of the mixed-ground product following the mixed grinding step may be performed with a known pressure forming machine or compression forming machine, e.g., a roller compactor, a roller crusher, a pelleting machine, etc.

Next, a method for pressing at least the lithium compound and the titanium compound simultaneously with grinding them will be described. In this case, a pressure grinder, a compression grinder, or a friction grinder can be used, and any grinder that performs grinding by using pressure or compressive force can be used as appropriate. For example, at least one grinder selected from a fret mill, a pan mill, an edge runner, a roller mill, and a mix muller (kneader) can be used. The grinding principles of these grinders are that a sample is pressed and is ground by this high pressure. The operating state of the fret mill will be described as an example. As heavy rollers rotate, a sample located under the rollers is frictionally ground. Since a plurality of compounds are frictionally ground under the rollers for a certain period of time, these compounds are mixed at the same time. With these grinders, the mixed power can be pressed simultaneously with being ground. This eliminates the need for a separate compressing step, whereby the process can be simplified.

The bulk density of the lithium titanate precursor is preferably 0.2 to 0.7 $g/cm^3$, and more preferably 0.4 to 0.6 $g/cm^3$. If the bulk density is lower than this range, there is a slight amount of contact between the titanium compound and the lithium compound, which decreases reactivity and thus productivity. If the bulk density is higher than this range, gas that is generated during reaction in the heating step is less likely to be removed and heat conduction is inhibited, which also decreases reactivity. As a result, the single-phase rate of lithium titanate produced is reduced in either case. In the case of pressing the ground mixed powder, applying a pressure of 0.6 $t/cm^2$ or less is preferable because a lithium titanate precursor having bulk density in the above range is likely to be obtained. This pressure is more preferably less than 0.5 $t/cm^2$, and still more preferably 0.15 to 0.45 $t/cm^2$.

The blending ratio of the lithium compound and the titanium compound can be determined according to the composition of the intended lithium titanate. For example, in order to produce $Li_4Ti_5O_{12}$ as lithium titanate, the lithium compound and the titanium compound are blended at the Li/Ti ratio of 0.79 to 0.85. Not the entire amount of the lithium compound and/or the titanium compound has to be used for the grinding. Part of the lithium compound and/or the titanium compound may be used for the grinding, and after the grinding, the remainder of the lithium compound and/or the titanium compound may be added to produce a lithium titanate precursor.

A lithium titanate compound having the same crystal structure as the intended lithium titanate may further be contained in the lithium titanate precursor of the present invention. This lithium titanate compound is used as necessary, and suppresses sintering of lithium titanate that is produced, or serves as a seed crystal. The use of the lithium titanate compound allows the heating step described below to be performed at a relatively low temperature, and allows grain growth of lithium titanate in the heating step to be appropriately controlled, facilitating production of intended lithium titanate. The lithium titanate compound therefore needs to have the same crystal structure as the intended lithium titanate. The particle diameter of the lithium titanate compound (primary particle diameter calculated by electron microscopy) is not particularly limited, and a lithium titanate compound can be used which has about the same particle diameter (primary particle diameter calculated by electron microscopy) as the intended lithium titanate, e.g., a mean particle diameter of about 0.5 to 2.0 μm. The lithium titanate compound can be produced by the method of the present invention. The blending amount of the lithium titanate compound is preferably 1 to 30 parts by weight, and more preferably 5 to 20 parts by weight per 100 parts by weight of the titanium compound as a raw material, based on the amount of Ti. A mixing aid etc. may further be used in the lithium titanate precursor.

It is preferable that the lithium titanate compound having the same crystal structure as the intended lithium titanate be contained in the titanium compound and/or the lithium compound before the grinding of the titanium compound and the lithium compound, be contained in the mixture before the grinding, or be fed into a grinder during the grinding so as to be ground together with the titanium compound and the lithium compound. Alternatively, this lithium titanate compound may be added to the lithium titanate precursor after the grinding, or may be added before or after the pressing.

In the present invention, various additives may be added to the lithium titanate precursor. For example, carbon or a carbon compound that becomes a conductive material by heating described below may be added, and a grinding aid, a forming aid, etc. may be added.

In the present invention, lithium titanate is produced by heating the lithium titanate precursor obtained by the above production method.

In order to heat the lithium titanate precursor to cause reaction of the compounds contained therein, namely the titanium compound, the lithium compound, and the lithium titanate compound having the same crystal structure as the intended lithium titanate, the raw materials are fed into a heating furnace, heated to a predetermined temperature, and held for a certain period of time. For example, a fluidized furnace, a stationary furnace, a rotary kiln, a tunnel kiln, etc. can be used as the heating furnace. The heating temperature is preferably 700° C. or higher and 950° C. or lower. For example, in the case of $Li_4Ti_5O_{12}$, a heating temperature lower than 700° C. is not preferable because the single-phase rate of the intended lithium titanate is reduced, and the amount of unreacted titanium compound is increased. A heating temperature higher than 950° C. is also not preferable because an impurity phase ($Li_2TiO_3$ or $Li_2Ti_3O_7$) is produced. A preferable heating temperature is 700° C. to 800° C., and lithium titanate with a single-phase rate described below of 95% or more, especially 97% or more, and with suppressed sintering and grain growth can be stably manufactured by using this temperature range. In particular, known dry production methods require heating at 800° C. or higher, preferably 900° C. or higher. However, with the lithium titanate precursor of the present invention, the above advantage is recognized even when heating is performed at 700° C. to 800° C. The single-phase rate is preferably 95% or more, more preferably 96% or more, and still more preferably 97% or more.

The heating time can be set as appropriate, and appropriate heating time is about 3 to 6 hours. The heating atmosphere is not limited, but can be an oxidizing atmosphere such as the atmosphere or oxygen gas, a non-oxidizing atmosphere such as nitrogen gas or argon gas, or a reducing atmosphere such as hydrogen gas or carbon monoxide gas, and the oxidizing atmosphere is preferable.

Moreover, in the method for producing lithium titanate according to the present invention, the lithium titanate precursor has high bulk density. This allows lithium titanate that is produced to have high bulk density, contributing to improvement in productivity.

The lithium titanate thus produced may be disintegrated or ground as necessary after cooling. Any known grinder described above can be used for grinding. Since the lithium titanate of the present invention has been less subjected to sintering and grain growth, it is preferable to perform disintegration or grinding as lithium titanate particles are easily separated and easily dispersed in paste when manufacturing an electrode of an electricity storage device.

The lithium titanate thus obtained has a large specific surface area. Specifically, the specific surface area is preferably 1.0 m$^2$/g or more, more preferably 2.0 to 50.0 m$^2$/g, and still more preferably 2.0 to 40.0 m$^2$/g. The bulk density and the mean particle diameter of the lithium titanate may be set as appropriate. The bulk density is preferably 0.1 to 0.8 g/cm$^3$, and more preferably 0.2 to 0.7 g/cm$^3$. The mean volume particle diameter is preferably 1 to 10 μm. The lithium titanate preferably has a low impurity content. Specifically, the impurity content is more preferably in the following range. Sodium (1,000 ppm or less), potassium (500 ppm or less), silicon (1,000 ppm or less), calcium (1,000 ppm or less), iron (500 ppm or less), chromium (500 ppm or less), nickel (500 ppm or less), manganese (500 ppm or less), copper (500 ppm or less), zinc (500 ppm or less), aluminum (500 ppm or less), niobium (0.3 wt % or less), zirconium (0.2 wt % or less), SO$_4$ (1.0 wt % or less), and chlorine (1.0 wt % or less).

The method for measuring each parameter used in the specification will be described.

(Specific Surface Area)

In the specification of the present application, the specific surface area was measured by a BET single-point method using nitrogen adsorption. The apparatus used was Monosorb made by Yuasa Ionics Co., Ltd. or Monosorb MS-22 made by Quantachrome Instruments.

(Particle Diameter of Lithium Compound)

In the specification of the present application, the mean particle diameter of the lithium compound refers to the mean volume particle diameter measured by a laser diffraction method. The mean volume particle diameter was measured with a laser diffraction/scattering particle size distribution analyzer by using ethanol as a dispersion medium. The measurement was performed by setting a refractive index to 1.360 for ethanol and setting a refractive index as appropriate for the lithium compound according to its kind. For example, a refractive index of 1.500 is used if the lithium compound is lithium carbonate. LA-950 made by HORIBA, Ltd. was used as the laser diffraction/scattering particle size distribution analyzer.

(Particle Diameter of Titanium Compound)

In the specification of the present application, the mean particle diameter of primary particles of the titanium compound is a mean value of particle diameters of 100 primary particles in an image measured with a transmission electron microscope (electron microscopy).

In the specification of the present application, the mean secondary particle diameter of secondary particles of the titanium compound refers to the mean volume particle diameter measured by a laser diffraction method. The mean volume particle diameter was measured with a laser diffraction/scattering particle size distribution analyzer by using pure water as a dispersion medium. The measurement was performed by setting a refractive index to 1.333 for pure water and setting a refractive index as appropriate for the titanium compound according to its kind. For example, a refractive index of 2.520 is used if the titanium compound is anatase titanium oxide. LA-950 made by HORIBA, Ltd. was used as the laser diffraction/scattering particle size distribution analyzer.

(Particle Diameter of Precursor Mixture)

In the specification of the present application, the mean particle diameter of a lithium titanate precursor mixture refers to the mean volume particle diameter measured by a laser diffraction method. The mean volume particle diameter was measured with a laser diffraction/scattering particle size distribution analyzer by using ethanol as a dispersion medium. The measurement was performed by setting a refractive index to 1.360 for ethanol and setting a refractive index for particles to be measured to a value of the kind of lithium compound blended. For example, a refractive index of 1.567 is used if the lithium compound is lithium carbonate. LA-950 made by HORIBA, Ltd. was used as the laser diffraction/scattering particle size distribution analyzer.

(Particle Diameter of Lithium Titanate)

In the specification of the present application, the mean particle diameter of primary particles of lithium titanate is a mean value of particle diameters of 100 primary particles in an image measured with a transmission electron microscope (electron microscopy).

In the specification of the present application, the mean secondary particle diameter of secondary particles of lithium titanate refers to the mean volume particle diameter measured by a laser diffraction method. The mean volume particle diameter is measured with a laser diffraction/scattering particle size distribution analyzer by using pure water as a dispersion medium. The measurement is performed by setting a refractive index to 1.333 for water and setting a refractive index as appropriate for lithium titanate according to its kind. A refractive index of 2.700 is used if lithium titanate is Li$_4$Ti$_5$O$_{12}$. In the present invention, LA-950 made by HORIBA, Ltd. was used as the laser diffraction/scattering particle size distribution analyzer.

(Single-Phase Rate of Lithium Titanate)

In the specification of the present application, the single-phase rate of lithium titanate refers to an index indicating the content of intended lithium titanate and represented by the following equation 1.

$$\text{Single-Phase Rate (\%)}=100\times(1-\Sigma(Yi/X)), \quad \text{(Equation 1)}$$

where "X" represents the main peak intensity of the intended lithium titanate in powder X-ray diffraction measurement using Cu-kα lines, and "Yi" represents the main peak intensity of each sub-phase. In the case of Li$_4$Ti$_5$O$_{12}$, "X" is the peak intensity at around 2θ=18°, and anatase or rutile TiO$_2$ or Li$_2$TiO$_3$ tends to exist as a sub-phase. Accordingly, "Yi" is the peak intensity at around 2θ=25° (anatase TiO$_2$), the peak intensity at around 2θ=27° (rutile TiO$_2$), and the peak intensity at around 2θ=44° (Li$_2$TiO$_3$).

(Bulk Density)

In the specification of the present application, the bulk density is obtained by a cylinder method (calculated from the volume and mass of a sample placed in a graduated cylinder).

(Impurities)

In the specification of the present application, sodium and potassium as impurities are measured by atomic absorption spectrometry, $SO_4$ and chlorine are measured by an ion chromatography method or an X-ray fluorescence spectrometer, and other elements such as silicon, calcium, iron, chromium, nickel, manganese, copper, zinc, aluminum, magnesium, niobium, and zirconium are measured by an ICP method. An X-ray fluorescence spectrometer (RIGAKU RIX-2200) was used for $SO_4$.

The present invention is an electrode active material, characterized by containing the lithium titanate of the present invention described above. The present invention is an electricity storage device, characterized by using the lithium titanate produced by the production method of the present invention described above. This electricity storage device includes an electrode, a counter electrode, and a separator, and an electrolyte solution, and the electrode is produced by adding a conductive material and a binder to the electrode active material and forming or applying the resultant mixture as appropriate. The conductive material is, e.g., a conductive aid such as carbon black, acetylene black, or Ketjenblack. The binder is, e.g., a fluororesin such as polytetrafluoroethylene, polyvinylidene fluoride, or fluoro rubber, or a water-soluble resin such as styrene-butadiene rubber, carboxymethyl cellulose, or polyacrylic acid. In the case of a lithium battery, the electrode active material can be used as a positive electrode, and metallic lithium, a lithium alloy, etc., or a carbon-containing material such as graphite can be used as a counter electrode. Alternatively, the electrode active material may be used as a negative electrode, and a lithium-transition metal composite oxide such as a lithium-manganese composite oxide, a lithium-cobalt composite oxide, a lithium-nickel composite oxide, a lithium-cobalt-manganese-nickel composite oxide, or a lithium-vanadium composite oxide, an olivine compound such as a lithium-iron-composite phosphoric acid compound, etc. may be used as a positive electrode. In either case, a porous polypropylene film etc. is used as the separator, and a commonly used material such as a solution of a lithium salt such as $LiPF_6$, $LiClO_4$, $LiCF_3SO_3$, $LiN(CF_3SO_2)_2$, or $LiBF_4$ in a solvent such as propylene carbonate, ethylene carbonate, dimethyl carbonate, diethyl carbonate, ethyl methyl carbonate, γ-butyrolactone, or 1,2-dimethoxyethane can be used as the electrolyte solution. The lithium titanate of the present invention may not only be used as an active material of a lithium secondary battery, but also be caused to adhere to the surface of other kinds of active material, be blended in the electrode, be contained in the separator, or be used as a lithium ion conductor. Alternatively, the lithium titanate of the present invention may be used as an active material of a sodium ion battery.

EXAMPLES

Examples of the present invention will be described below, but the present invention is not limited to them.

Example 1

Raw materials were obtained so that titanium oxide powder (made by ISHIHARA SANGYO KAISHA, LTD., purity: 97.3%, mean volume particle diameter: 1.3 µm, specific surface area: 93 m$^2$/g, bulk density: 0.3 g/cm$^3$) as a titanium compound and lithium carbonate powder (purity: 99.2%, mean volume particle diameter: 7.5 µm) as a lithium compound had a Li/Ti molar ratio of 0.81. Moreover, 5 parts by weight of lithium titanate ($Li_4Ti_5O_{12}$, purity: 99%, mean particle diameter (electron microscopy): 1 µm) as a lithium titanate compound having the same crystal structure as intended lithium titanate was added to 100 parts by weight of the raw materials, and was mixed/ground/compressed in a fret mill (grinding rollers: 40 kg, roller rotational speed: 50 rpm) for 15 minutes to produce a lithium titanate precursor. This precursor had bulk density of 0.6 g/cm$^3$, a mean volume particle diameter of 0.4 µm, and D90 of 6.2 µm, and had one peak in a frequency curve of a particle size distribution. Then, the lithium titanate precursor was heated at 750° C. in the atmosphere for 3 hours in an electric furnace to synthesize lithium titanate. The lithium titanate thus obtained was disintegrated in a jet mill to obtain Sample 1. The bulk density of Sample 1 thus obtained was 0.6 g/cm$^3$. The bulk density was calculated from the volume and mass of the sample placed in a graduated cylinder. The specific surface area (BET single-point method using nitrogen adsorption, Monosorb MS-22 made by Quantachrome Instruments) was 5 m$^2$/g. The particle size distribution of the lithium titanate precursor was measured with a laser diffraction/scattering particle size distribution analyzer (LA-950 made by HORIBA, Ltd.), and the measurement was performed by setting a refractive index to 1.360 for a dispersion medium and to 1.567 for particles to be measured.

Example 2

Raw materials were obtained so that titanium oxide powder (made by ISHIHARA SANGYO KAISHA, LTD., purity: 97.3%, mean volume particle diameter: 1.3 µm, specific surface area: 93 m$^2$/g, bulk density: 0.3 g/cm$^3$) as a titanium compound and lithium carbonate powder (purity: 99.2%, mean volume particle diameter: 7.5 µm) as a lithium compound had a Li/Ti molar ratio of 0.81. Moreover, 5 parts by weight of lithium titanate ($Li_4Ti_5O_{12}$, purity: 99%, mean particle diameter (electron microscopy): 1 µm) as a lithium titanate compound having the same crystal structure as intended lithium titanate was added to 100 parts by weight of the raw materials, and was mixed in a Henschel mixer at 1,020 rpm for 5 minutes. Then, the resultant mixed powder was ground in a jet mill (STJ-200 made by Seishin Enterprise Co., Ltd.). This powder had a mean volume particle diameter of 0.4 µm and D90 of 2.2 µm, and had one peak in a frequency curve of a particle size distribution. The bulk density was 0.3 g/cm$^3$. After the grinding, the powder was pressed (compression pressure: 0.4 ton/cm$^2$) in a roller compactor (WP160×60 made by FREUND-TURBO CORPORATION) to produce a lithium titanate precursor. The bulk density of this precursor was 0.7 g/cm$^3$. Then, the lithium titanate precursor was heated at 750° C. in the atmosphere for 3 hours in an electric furnace to synthesize lithium titanate. The lithium titanate thus obtained was disintegrated in a jet mill to obtain Sample 2. The bulk density of Sample 2 thus obtained was 0.6 g/cm$^3$.

Example 3

Raw materials were obtained so that titanium oxide powder (made by ISHIHARA SANGYO KAISHA, LTD., purity: 97.3%, mean volume particle diameter: 1.3 µm, specific surface area: 93 m$^2$/g) as a titanium compound and lithium carbonate powder (purity: 99.2%, mean volume particle diameter: 7.5 µm) as a lithium compound had a Li/Ti molar ratio of 0.81. Moreover, 5 parts by weight of lithium titanate ($Li_4Ti_5O_{12}$, purity: 99%, mean particle diameter (electron microscopy): 1 µm) as a lithium titanate compound having the same crystal structure as intended lithium titanate was added to 100 parts by weight of the raw materials, and was mixed in a Henschel mixer at 1,020 rpm for 5 minutes.

Then, the resultant mixed powder was ground in a jet mill to produce a lithium titanate precursor. This precursor had bulk density of 0.3 g/cm$^3$, a mean volume particle diameter of 0.4 μm, and D90 of 2.2 μm, and had one peak in a frequency curve of a particle size distribution. Subsequently, the lithium titanate precursor was heated at 750° C. in the atmosphere for 3 hours in an electric furnace to synthesize lithium titanate. The lithium titanate thus obtained was disintegrated in a jet mill to obtain Sample 3. The bulk density of Sample 3 thus obtained was 0.3 g/cm$^3$.

Comparative Example 1

Raw materials were obtained so that titanium oxide powder (made by ISHIHARA SANGYO KAISHA, LTD., purity: 97.3%, mean volume particle diameter: 1.3 μm, specific surface area: 93 m$^2$/g, bulk density: 0.3 g/cm$^3$) as a titanium compound and lithium carbonate powder (purity: 99.2%, mean volume particle diameter: 7.5 μm) as a lithium compound had a Li/Ti molar ratio of 0.81. Moreover, 5 parts by weight of lithium titanate (Li$_4$Ti$_5$O$_{12}$, purity: 99%, mean particle diameter (electron microscopy): 1 μm) as a lithium titanate compound having the same crystal structure as intended lithium titanate was added to 100 parts by weight of the raw materials, and was mixed in a Henschel mixer at 1,800 rpm for 10 minutes to produce a lithium titanate precursor. This precursor had bulk density of 0.3 g/cm$^3$, a mean volume particle diameter of 0.9 μm, and D90 of 15.2 μm, and two peaks were recognized in a frequency curve of a particle size distribution. Subsequently, the lithium titanate precursor thus obtained was heated at 750° C. in the atmosphere for 3 hours in an electric furnace to synthesize lithium titanate. The lithium titanate thus obtained was disintegrated in a jet mill to obtain Sample 4. The bulk density of Sample 4 thus obtained was 0.3 g/cm$^3$.

Comparative Example 2

Lithium titanate (Sample 5) was synthesized in a manner similar to that of Comparative Example 1 except that the lithium titanate precursor in Comparative Example 1 is further pressed (compression pressure: 0.4 ton/cm$^2$) in a roller compactor to produce a lithium titanate precursor. The bulk density of this precursor was 0.6 g/cm$^3$, and the bulk density of Sample 5 was 0.6 g/cm$^3$.

(Evaluation 1)

Powder X-ray diffraction patterns of Samples 1 to 5 thus obtained were measured with a powder X-ray diffractometer (Ultima IV made by Rigaku Corporation, Cu-kα lines). Of the measured peak intensities, the peak intensity of Li$_4$Ti$_5$O$_{12}$ at around 2θ=18° was used as "X," and the peak intensity of anatase TiO$_2$ at around 2θ=25° was used as "Yi" to calculate the single-phase rate described above. The respective single-phase rates were as follows. Sample 1: 96%, Sample 2: 98%, Sample 3: 96%, Sample 4: 93%, and Sample 5: 90%. Neither a peak of rutile TiO$_2$ at around 2θ=27° nor a peak of Li$_2$TiO$_3$ at around 2θ=44° was observed. The FIGURE shows the powder X-ray diffraction measurement result of Samples 1 and 4 as a representative example. In Sample 3 using a lithium titanate precursor prepared by grinding at least a lithium compound and a titanium compound in the state where these compounds coexist, and Samples 1 and 2 using a lithium titanate precursor prepared by grinding at least a titanium compound and a lithium compound in the state where these compounds coexist and pressing these compounds simultaneously with and/or after the grinding, lithium titanate, Li$_4$Ti$_5$O$_{12}$, having a single-phase rate of 95% or more was obtained even by heating at 750° C. However, in Sample 4 using a lithium titanate precursor prepared by merely mixing a lithium compound and a titanium compound without grinding at least the titanium compound and the lithium compound in the state where these compounds coexist, and Sample 5 using a lithium titanate precursor prepared by merely pressing the titanium compound and the lithium compound without grinding at least the titanium compound and the lithium compound in the state where these compounds coexist, lithium titanate, Li$_4$Ti$_5$O$_{12}$, having a single-phase rate of 95% or more was not obtained by heating at 750° C. This shows that, by the production method of the present invention, lithium titanate having a single-phase rate of 95% or more can be synthesized even if heating for synthesizing lithium titanate is performed at a low temperature, specifically less than 800° C.

(Evaluation 2)

Evaluation of Battery Characteristics (1) Production of Electricity Storage Device Lithium titanate of Sample 1, acetylene black powder as a conductive material, and a polyvinylidene fluoride resin as a binder were mixed at a weight ratio of 100:5:7, and kneaded in a mortar to prepare paste. This paste was applied to aluminum foil and dried at a temperature of 120° C. for 10 minutes. Then, a circular shape with a diameter of 12 mm was punched out of the dried paste, and pressed at 17 MPa to form a working electrode. The electrode contained 3 mg of an active material.

After vacuum drying at a temperature of 120° C. for 4 hours, this working electrode was installed as a positive electrode in a sealable coin cell in a glove box with a dew point of −70° C. or lower. The coin cell used was made of stainless steel (SUS316) and had an outer diameter of 20 mm and a height of 3.2 mm. Metallic lithium with a thickness of 0.5 mm was formed into a circular shape with a diameter of 12 mm for use as a negative electrode. A mixed solution of ethylene carbonate and dimethyl carbonate (mixed at a volume ratio of 1:2) with LiPF$_6$ dissolved therein at a concentration of 1 mol/liter was used as a non-aqueous electrolyte solution.

The working electrode was placed in a lower container of the coin cell, a porous polypropylene film was disposed thereon as a separator, and the non-aqueous electrolyte solution was dropped thereon. A negative electrode, and a 0.5 mm thick spacer for thickness adjustment and a spring (both made of SUS316) were further placed thereon. An upper cap with a polypropylene gasket was placed thereon, and the outer peripheral edge thereof is caulked for sealing. An electricity storage device (Sample A) was thus obtained.

Electricity storage devices (Samples B, C) were obtained by a method similar to that of the electricity storage device of Sample A except that Sample 2 or 4 was used as lithium titanate instead of Sample 1.

(2) Evaluation of Rate Characteristics

Discharge capacity of the electricity storage devices thus fabricated (Samples A to C) was measured with various current amounts to calculate a capacity retention rate (%). The measurement was performed in the voltage range of 1 to 3 V and with a charging current of 0.25 C and a discharging current in the range of 0.25 C to 30 C. The ambient temperature was 25° C. The capacity retention rate was calculated by the expression "(Xn/X0.25)×100," where "X0.25" is a measured value of the discharge capacity at 0.25 C, and "Xn" is a measured value of the discharge capacity at 0.5 C to 30 C. As used herein, "1 C" refers to a current value with which the electricity storage device can be fully charged in one hour. In this evaluation, 0.48 mA corresponds to 1 C. The higher the capacity retention rate is, the better the rate characteristics are. The result is shown in Table 1. The result shows that the electricity storage devices of the present invention (Samples A, B) have better rate characteristics than the comparative example (Sample C).

TABLE 1

|  | Device | Capacity Retention Rate (%) | | | | | |
|---|---|---|---|---|---|---|---|
|  |  | 0.5 C | 1.0 C | 5.0 C | 10 C | 20 C | 30 C |
| Example 1 | Sample A | 99.3 | 98.3 | 88.5 | 78.0 | 58.8 | 44.3 |
| Example 2 | Sample B | 99.6 | 98.6 | 88.0 | 78.2 | 64.2 | 53.9 |
| Comparative Example 1 | Sample C | 99.1 | 97.6 | 84.6 | 71.2 | 49.5 | 36.2 |

INDUSTRIAL APPLICABILITY

With the method for producing lithium titanate according to the present invention, intended lithium titanate can be reliably and stably produced at low cost even at a lower heating temperature than conventional production methods.

Moreover, an electricity storage device having great battery characteristics, in particular great rate characteristics, can be produced by using lithium titanate produced by the above method as an electrode active material.

The invention claimed is:

1. A method for producing lithium titanate, the method comprising:
   adding a lithium titanate compound in powdered form to one or more of a lithium compound in powdered form, a titanium compound in powdered form, or a mixture thereof, said lithium titanate compound having a same crystal structure as an intended lithium titanate;
   mixing said lithium compound, said titanium compound and said lithium titanate compound;
   grinding said lithium compound, said titanium compound and said lithium titanate compound in a state where these compounds coexist to produce a lithium titanate precursor; and
   heating said lithium titanate precursor.

2. The method according to claim 1, further comprising:
   prior to said mixing, grinding one of said lithium compound or said titanium compound.

3. The method according to claim 1, wherein said grinding is performed with an airflow crusher.

4. The method according to claim 1, further comprising:
   pressing said compounds in a mixed state simultaneously with and/or after said grinding.

5. The method according to claim 4, wherein said pressing is performed with a compression forming machine.

6. The method according to claim 4, wherein said grinding and said pressing are performed with at least one machine selected from the group consisting of a fret mill, a pan mill, an edge runner, a roller mill, and a mix marler.

7. The method according to claim 4, wherein said pressing is performed under a condition that a bulk density of said mixed compounds is increased at least twice as high as before said pressing.

8. The method according to claim 1, wherein said heating is performed at a temperature of 700° C. to 800° C.

9. The method according to claim 1, further comprising: forming an electrode active material comprising the lithium titanate.

10. The method according to claim 1, further comprising: forming an electricity storage device using the lithium titanate.

11. The method according to claim 1, wherein said lithium titanate compound having a same crystal structure as the intended lithium titanate has a mean primary particle diameter of 0.5 μm to 2.0 μm.

12. The method according to claim 1, wherein a blending amount of said lithium titanate compound having a same crystal structure as the intended lithium titanate is 1 to 30 parts by weight per 100 parts by weight of said titanium compound.

13. The method according to claim 1, further comprising: adding particles of the lithium titanate compound, particles of the lithium compound, and particles of the titanium compound to a container prior to said mixing.

14. The method according to claim 13, wherein said mixing is performed before heating the lithium titanate precursor to a temperature of at least 700° C.

15. The method according to claim 13, wherein said mixing is performed before heating the lithium titanate precursor to a temperature of at least 800° C.

16. The method of claim 1, wherein the lithium titanate compound is represented by $Li_4Ti_5O_{12}$.

17. The method of claim 1, wherein
   said lithium compound is selected from a group consisting of lithium hydroxide, lithium carbonate, lithium nitrate, lithium sulfate, and lithium oxide, and
   said titanium compound is selected from a group consisting of metatitanic acid, orthotitanic acid, and a titanium oxide.

18. The method of claim 1, wherein said lithium compound comprises lithium carbonate.

19. The method of claim 18, wherein said titanium compound comprises an anatase type titanium oxide.

* * * * *